United States Patent [19]

Kyrtsos et al.

[11] Patent Number: 4,887,454

[45] Date of Patent: Dec. 19, 1989

[54] METHOD FOR MONITORING A WORK VEHICLE SUSPENSION

[75] Inventors: Christos T. Kyrtsos; F. Paul Lutgen, both of Peoria; Adam J. Gudat, Edelstein, all of Ill.

[73] Assignee: Caterpillar Inc., Peoria, Ill.

[21] Appl. No.: 294,441

[22] Filed: Jan. 9, 1989

Related U.S. Application Data

[62] Division of Ser. No. 137,793, Mar. 2, 1988, Pat. No. 4,845,975, which is a division of Ser. No. 935,870, Nov. 28, 1986, Pat. No. 4,774,239.

[51] Int. Cl.[4] .......................................... G01M 17/04
[52] U.S. Cl. ........................................................ 73/11
[58] Field of Search ............... 73/11, 118.1; 340/52 R, 340/56; 364/424.03, 550, 551

[56] References Cited

U.S. PATENT DOCUMENTS

| | | | |
|---|---|---|---|
| 2,638,777 | 5/1953 | Sadler | 73/11 |
| 3,900,828 | 8/1975 | Lage et al. | 340/666 |
| 4,002,051 | 1/1977 | Hilbrands | 73/11 |
| 4,317,105 | 2/1982 | Sinha et al. | 340/52 R |
| 4,426,683 | 1/1984 | Kissell | 73/11 |
| 4,458,234 | 7/1984 | Brisard | 340/52 R |
| 4,459,579 | 7/1984 | David et al. | 340/58 |
| 4,468,650 | 8/1984 | Barbee | 340/52 R |
| 4,550,385 | 10/1985 | Pulk et al. | 364/558 |
| 4,574,267 | 3/1986 | Jones | 340/58 |
| 4,635,739 | 1/1987 | Foley et al. | 177/45 |

FOREIGN PATENT DOCUMENTS

| | | | |
|---|---|---|---|
| 0141329 | 6/1960 | U.S.S.R. | 73/11 |
| 2093946 | 9/1982 | United Kingdom | 73/11 |

Primary Examiner—Robert R. Raevis
Attorney, Agent, or Firm—Robert E. Muir; Wei Wei Jeang

[57] ABSTRACT

Off-highway trucks generally rely on a suspension system which employs a plurality of gas-over-liquid type struts. These struts are critical to proper operation of the vehicle such that a single collapsed strut can have serious manifestations in structural damage, tire wear, and payload monitor accuracy. These consequences can be mitigated by an accurate and reliable strut monitor. Pressure type sensors are disposed on each of the struts and their pressure is monitored during three critical phases of operation. These phases include static, loading, and roading modes and each mode requires a distinct method for detecting a collapsing strut. The presence of a collapsing strut, detected by any of the three methods, is communicated to the vehicle operator whereby operation can be immediately suspended. The system avoids the serious consequences of vehicle operation with a collapsed strut by providing the operator with immediate and positive feedback on the condition of the struts.

8 Claims, 6 Drawing Sheets

METHOD FOR MONITORING A WORK VEHICLE SUSPENSION

This application is a division of a prior application Ser. No. 137,793, filed Mar. 2, 1988, now U.S. Pat. No. 4,845,975 which is a division of parent application, Ser. No. 935,870, filed Nov. 28, 1986, now U.S. Pat. No. 4,744,239.

TECHNICAL FIELD

This invention relates generally to a method for accurately determining the condition of a work vehicle suspension, and more particularly to a method which detects a collapsed strut by monitoring strut pressures.

BACKGROUND ART

In the field of off-highway trucks used, for example, in mining operations, it is desirable that an accurate record be kept of the quantity of material removed from the mining site. This information can be used to calculate mine and truck productivity as well as aid in forecasting profitability and work schedules.

Prior systems, as disclosed in U.S. application Ser. No. 749,607 filed June 25, 1985 by D. Foley et al., have shown that strut pressure can be an accurate indicator of payload. The apparatus disclosed therein includes an electronic control which monitors each of the strut pressures, compensates for various inaccuracies introduced by load distribution and vehicle attitude, and correlates this information into actual payload. However, proper operation of the payload monitor requires that all of the struts be in good working order. For example, theoretical calculations for a particular family of struts have shown that a loss of 125 ml of oil from a single strut can generate a 22% error in calculated payload. No provision has been made for monitoring the condition of the struts and indicating the condition of a faulty strut.

Prior systems have relied upon the vehicle operator to visually inspect each of the struts before operating the vehicle. This practice introduces considerable subjectivity into the system and results in the vehicle being operated with partially or completely collapsed struts. Both operator inattention and inability to recognize a collapsed strut are contributing factors to erroneous operation; however, even with proper inspections the strut may also collapse during operation. In large off-highway trucks, a single collapsed strut will not have significant effect on the "feel" of the truck and can easily go unnoticed by an experienced operator.

Operation of the vehicle with a collapsing strut will have obvious effects on the accuracy of the payload monitor owing to the change in the relationship between strut pressure and payload. Other serious consequences also result from such operation. For example, uneven tire wear is an undesirable result of extended vehicle operation with a collapsed strut. Tires are a major operating expense of off-highway trucks and any change in their replacement schedule can have serious impact on profitability. Thus, a collapsed strut can have economic impact other than replacement of the damaged strut. Moreover, a completely collapsed strut results in repeated metal-to-metal contact and the possibility of eventual major structural failure. Frame damage can occur after relatively short periods of operation and the resultant repair costs can be exorbitant.

The present invention is directed to overcoming one or more of the problems as set forth above.

DISCLOSURE OF THE INVENTION

In accordance with one aspect of the present invention, a method for detecting a collapsed strut of a work vehicle which has a plurality of left and right strut mounted wheels includes the steps of periodically sensing the internal pressure of selected struts and delivering a plurality of first signals each having a magnitude correlative to the internal pressure of each respective selected strut. The method further includes the steps of deriving an indication of the condition of each of the struts responsive to the pressure of the selected struts and delivering a signal indicative of a collapsed strut in response to the pressure signals being outside a preselected range.

In accordance with another aspect of the present invention, a method for detecting one of a collapsed strut and an underinflated tire of a work vehicle which has a plurality of left and right strut mounted wheels includes the steps of periodically sensing the internal pressure of each of the struts and delivering a plurality of first signals each having a magnitude correlative to the internal pressure of each respective strut. The method further includes the steps of comparing consecutive first signals of each respective strut and delivering a second signal having a magnitude correlative to the differential therebetween, counting the number of second signals exceeding a preselected setpoint during a preselected period of time, comparing the count for each strut to the count for another strut and delivering a third signal in response to the count differential exceeding a preselected setpoint. The counts of the same side adjacent struts on the side of the vehicle associated with the lowest count are compared in response to receiving the second signal and delivering a signal indicative of one of a collapsed strut and an underinflated tire in response to the count differential exceeding a preselected setpoint.

In accordance with another aspect of the present invention, a method for detecting a collapsed strut of a work vehicle which has a plurality of left and right strut mounted wheels includes the steps of periodically sensing the internal pressure of selected struts and delivering a plurality of first signals each having a magnitude correlative to the internal pressure of each respective selected strut. The method further includes the steps of calculating individual strut displacement in response to the magnitude of the first signals, comparing the calculated strut displacement to a desired displacement and delivering a signal responsive to the difference therebetween. A signal indicative of a collapsed strut is delivered in response to the differential exceeding a preselected setpoint.

In accordance with another aspect of the present invention, a method for detecting a collapsed strut of a work vehicle which has a plurality of left and right strut mounted wheels includes the steps of periodically sensing the internal pressure of selected struts and delivering a plurality of first signals each having a magnitude correlative to the internal pressure of each respective strut. The method further includes the steps of storing a first set of the periodically delivered first signals in response to the first signals remaining substantially stable at a first magnitude for a preselected duration of time, storing a second set of the periodically delivered first signals in response to the first signals remaining substantially stable at a second magnitude for a preselected duration of time, computing the stiffness for each of the struts in response to the difference in magnitude between the first and second sets of periodically delivered first signals, comparing the stiffness of each of the struts to the stiffness of another of the selected struts, and delivering second signals each having a magnitude correlative to the stiffness differential. A signal indicative of a collapsed strut is delivered in response to the differential exceeding a preselected setpoint.

BRIEF DESCRIPTION OF THE DRAWINGS

FIG. 4 illustrates a portion of one embodiment of the software flowchart for implementing the suspension monitor during a loading portion of a truck cycle.

BEST MODE FOR CARRYING OUT THE INVENTION

Figure 1:
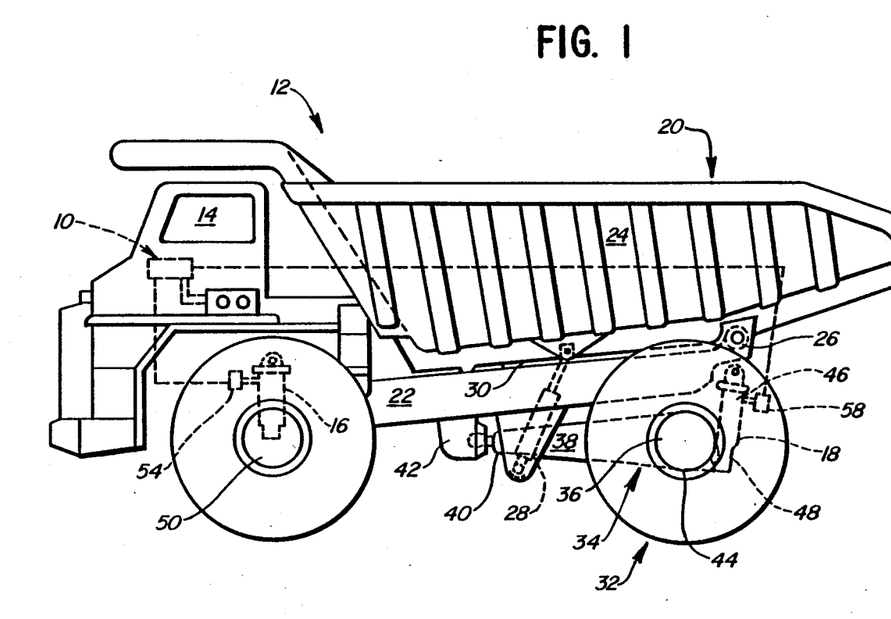
FIG. 1 illustrates a diagrammatic view of an off-highway truck and the location of critical suspension components.

Referring now to the drawings, wherein a preferred embodiment of the present apparatus 10 is shown, FIG. 1 illustrates a work vehicle 12 which can be, for example, an off-highway truck 14. The truck has at least one front and rear strut 16,18 disposed in supporting relation to a lead carrying portion 20 of the work vehicle 12. The preferred embodiment has two front and two rear struts 16L,16R;18L,18R which are the gas-over-liquid type commonly known in the industry and not described herein. It is sufficient in the understanding of the instant apparatus 10 to recognize that the pressure of the fluid is indicative of the magnitude of the load applied to the strut 16,18 and that wide swings in the strut pressures are normal and even expected during actual "roading". Moreover, a strut which has lost pressure and collapsed shows little response to "roading" with significantly less variation in strut pressure. Conversely, an underinflated tire will increase the frequency of the strut pressure variations within the strut supporting that tire. The underinflated tire has a lower spring coefficient than a properly inflated tire and will resultantly increase the oscillatory response of the suspension with corresponding variations in the damping strut pressure.

The load carrying portion 20 includes a vehicular frame 22 and dump body 24. The dump body 24 is connected to the frame 22 by pivot pin 26 and a hydraulic cylinder 28 such that the contents of the dump body 24 can be removed by controllably pressurizing the cylinder 28 to effect pivotal movement of the dump body 24 about the pivot pin 26. In the transport mode, the cylinder 28 is not pressurized and the weight of the dump body is transferred to the frame through the pivot pin 26 and a support pad 30 fixed to the frame 22.

The work vehicle 12 further includes a ground engaging portion 32 and a suspension means 34 for supporting the load carrying portion 20 in a manner to provide damped oscillatory motion between the ground engaging portion 32 and the load carrying portion 20.

The suspension means 34 includes a rear axle housing 36 and an A-frame moment arm 38. The A-frame moment arm 38 has a first end portion 40 pivotally connected to the vehicular frame 22 by a socket 42 and a second end portion 44 fixedly connected to the rear axle housing 36. The first end portion 40 of the A-frame moment arm 38 is a king bolt arrangement, substantially spherical in shape and retained from lateral movement by the socket 42. The rear strut 18 has a first end portion 46 pivotally connected to the vehicular frame 22 and a second end portion 48 pivotally connected to the second end portion 44 of the A-frame moment arm 38.

During loading of the truck, as the payload increases, the load carrying portion 20 will be displaced in a direction toward the ground engaging portion 32. The rear strut 18 begins to compress while the A-frame moment arm 38 pivots about first end portion 40. A distance L2 is defined to be the distance between the first end portion 40 pivot point and the second end portion 44 pivot point of the arm 38. Therefore, it can be shown that the rear strut pressure differential is a function of the suspension means 34. Moreover, the rear strut pressure differential can be related to the reaction force R between a work surface and the ground engaging portion 32. A force S experienced by the rear strut 18 can be determined by measuring the internal pressure of the strut 18, subtracting the rear strut pressure corresponding to an unloaded truck, and multiplying the differential pressure by the area of the strut 18. A reaction force R is proportional to the payload of the vehicle 12 and can be assumed to act through the center of the rear axle housing 36 such that a summation of the moments about the pivot point of the king bolt would derive the following equation:

$$R = S * L2/L3 \qquad \text{(eqn. 1.1)}$$

where the horizontal distance between the first end portion 40 pivot point and the center of rear axle housing 36 is defined to be L3.

Similarly, the front strut 16 will be compressed as the load increases; however, the front strut is connected directly between the frame 22 and a front axle housing 50. A more straightforward relationship exists here in that a force F experienced by the front strut 16 can be determined by measuring the internal pressure of the strut 16, subtracting the front strut pressure corresponding to an unloaded truck, and multiplying the pressure by the area of the strut 16. The reaction force F between the ground engaging portion 32 and the work surface is substantially equivalent to the force F experienced by the front strut 16.

Figure 2:
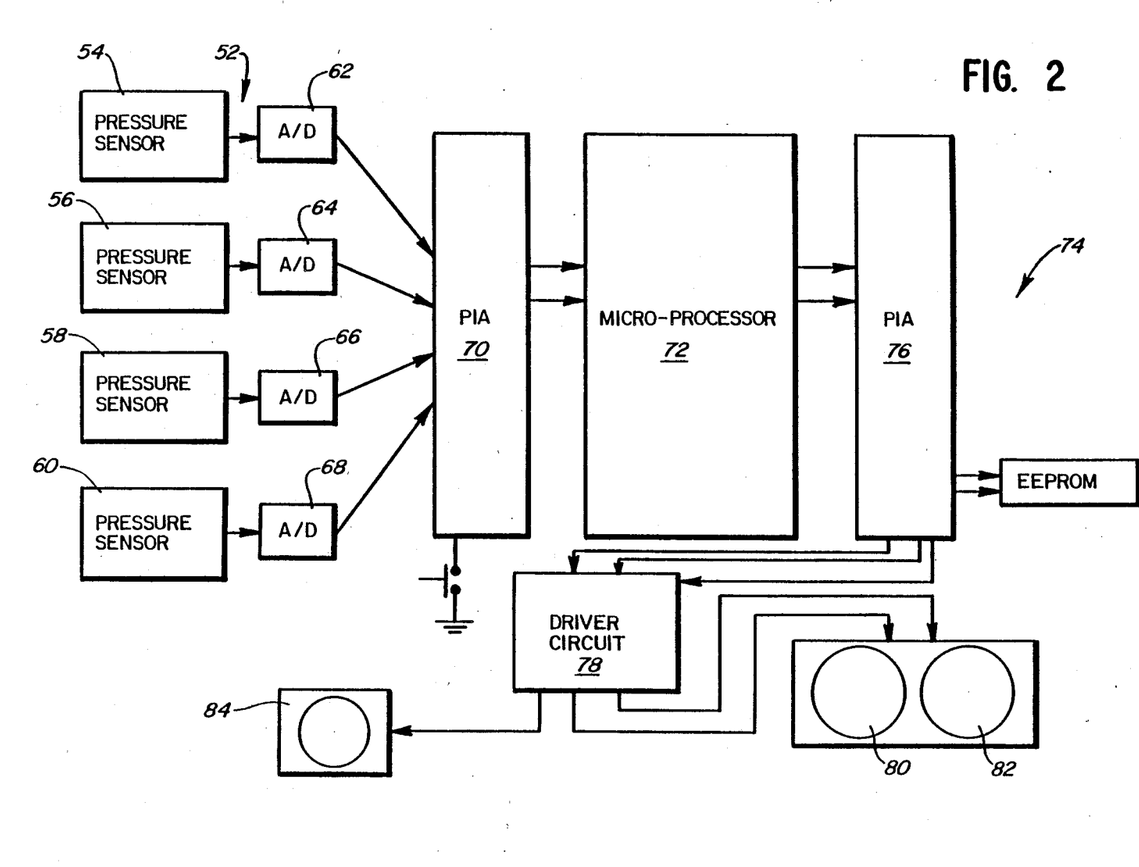
FIG. 2 illustrates a block diagram of the suspension monitor.

The apparatus 10 is shown in FIG. 1 to illustrate the relationship between the work vehicle 12 and the location of the apparatus 10. A more detailed block diagram of the apparatus 10 is shown in FIG. 2 and diagrammatically illustrates a means 52 which periodically senses the pressures of each of the struts 16,18 and delivers a plurality of signals respectively correlative to the magnitude of the internal strut pressures. The means 52 includes a plurality of pressure sensors 54,56,58,60 of the type commercially available from Dynisco as part number PT306. The pressure sensors 54,56,58,60 are respectively associated with the two front struts 16L,16R and the two rear struts 18L,18R. Each of the pressure sensors 54,56,58,60 delivers an analog signal proportional to the magnitude of the pressure of the respective strut 16L,16R,18L,18R to respective analog to digital converters (A/D) 62,64,66,68. The A/D,s 62,64,66,68 can be of the type commercially available from Analog Devices as part number AD575A. Other types of A/D converters have been contemplated by the inventor and the choice of the particular A/D disclosed herein is simply a matter of designer discretion. The selection of a device which provides an analog to frequency output is particularly well suited to the digital microprocessor environment disclosed herein; however, other similar devices could be easily substituted without departing from the spirit of the invention.

A Motorola programmable interface array (PIA) 70 receives the digital frequencies output by the A/D converters 62,64,66,68 and delivers these signals to a microprocessor 72 under software control. In the preferred embodiment, the microprocessor 72 is part number 6809 provided by the Motorola Corp. The apparatus 10 also includes a means 74 which receives the control signal and delivers an indication of the magnitude of the work vehicle payload in response to the magnitude of the control signal. The indicating means 74 includes a second PIA 76 connected through a driver circuit 78 to a pair of individually energizable incandescent lamps 80,82. These lamps 80,82 are used to give indication to both the truck operator and the operator of the loading equipment of the status of the load relative to rated truck capacity.

A third incandescent lamp 84 is connected to the PIA 76 via the driver circuit 78. The third lamp 84 is addressable by the microprocessor 72 to indicate either a collapsed strut or an underinflated tire and can be viewed primarily by the truck operator.

Figure 3:
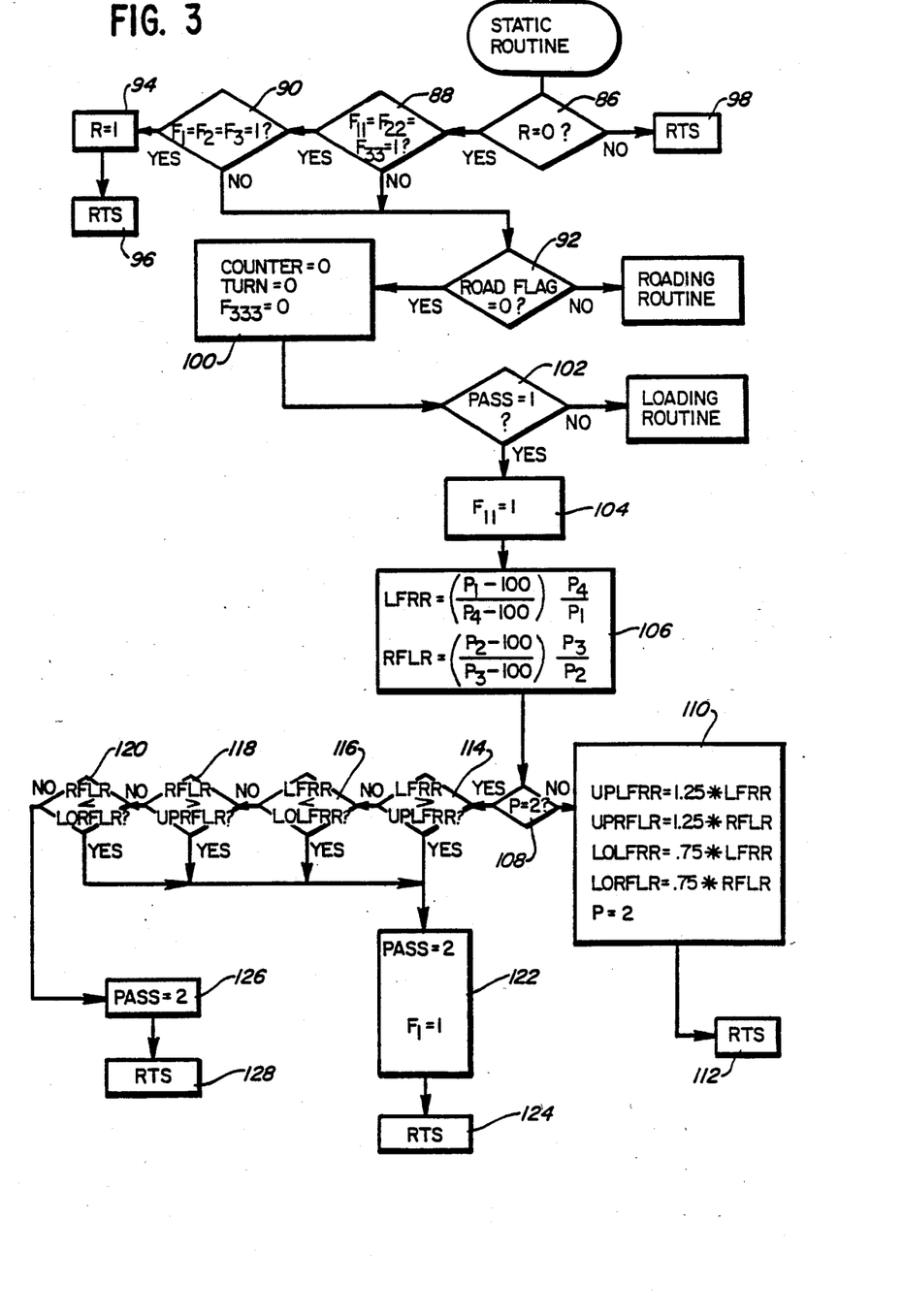
FIG. 3 illustrates a portion of one embodiment of the software flowchart for implementing the suspension monitor during a static portion of a truck cycle.
Figure 5A:
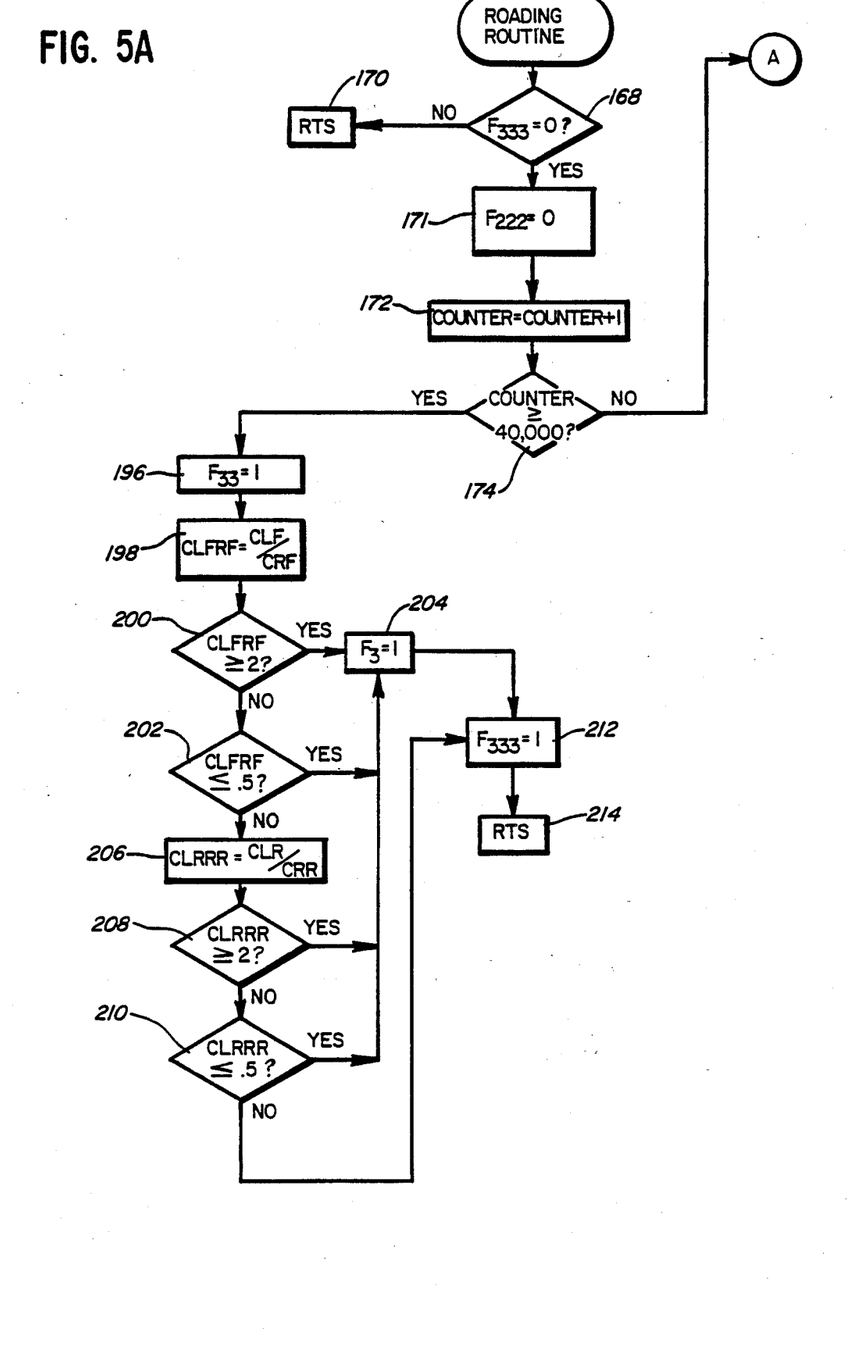
FIGS. 5A and 5B illustrates a portion of one embodiment of the software flowchart for implementing the suspension monitor during a roading portion of a truck cycle.
Figure 5B:
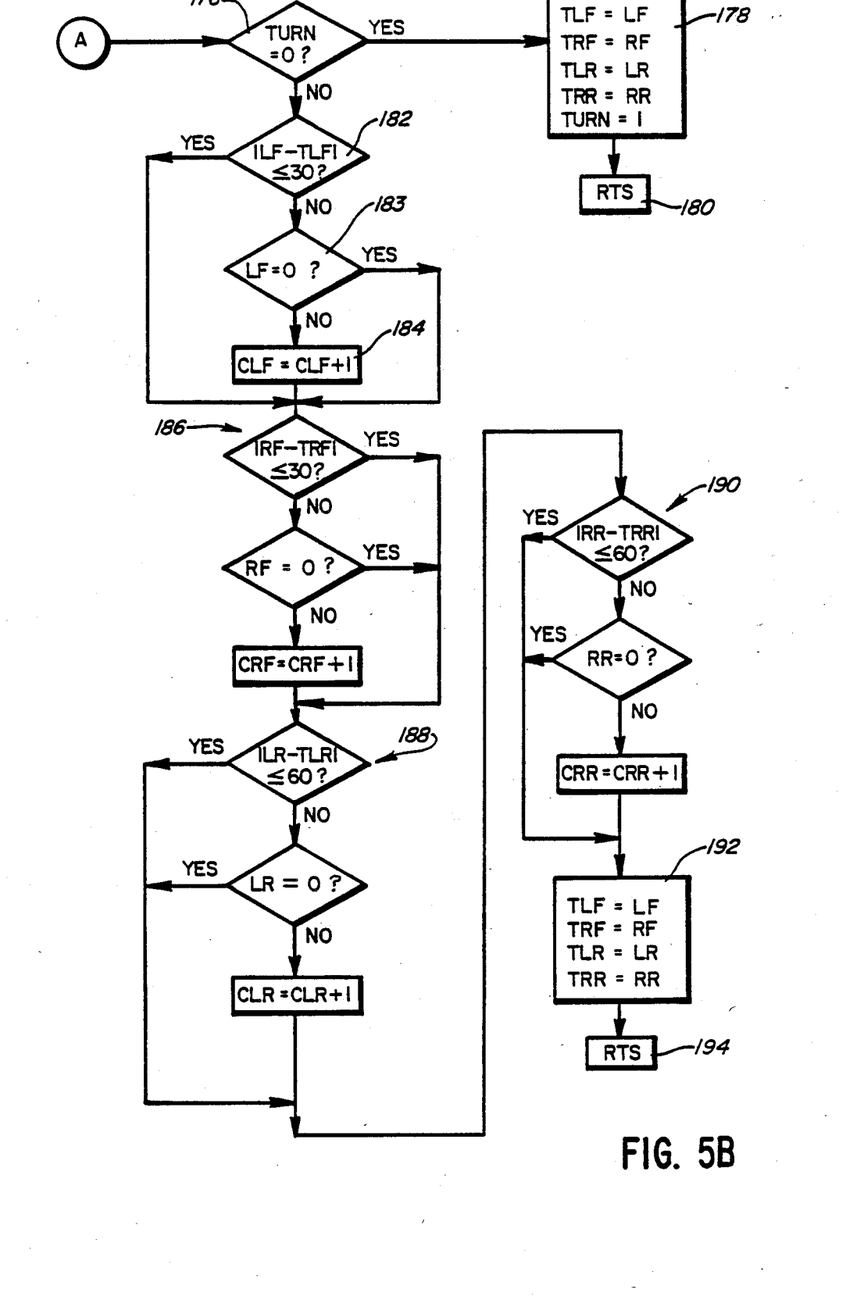

Referring now to FIGS. 3, 4, and 5, subroutines are diagrammatically illustrated via flowcharts which disclose software routines for detecting a collapsed strut of a work vehicle having a plurality of left and right strut mounted wheels. Each of the routines is associated with a particular phase of vehicle operation and will only be executed when the vehicle is detected to be operating in a preselected manner. For example, off-highway trucks are known to operate in a particular routine and can, at any point in time, be expected to be static when waiting to receive or to dump a load, loading when actually receiving a load, or roading when driving the vehicle between the roading site and the dumping site.

In the static subroutine of FIG. 3, the software first checks to determine if all of the subroutines have been executed and whether each subroutine has detected a collapsed strut. If all of the routines are in agreement that a strut has collapsed, then control returns to the main control loop without further processing. In this way microprocessor time is conserved for execution of the main control routine. In decision block 86, the value of a variable R is checked. R=O is an indication that not all of the routines have detected a collapsed strut and it is desirable to execute at least one of the subroutines. Control passes to a decision block 88 which checks to determine if each of the subroutines nave been executed. The variables F11, F22, and F33 are respectively set to the value "1" at the successful completion of the static, loading, and roading subroutines. If all of the subroutines have been executed, control passes to a decision block 90. An unexecuted subroutine results in the decision block 90 being bypassed in favor of a decision block 92. In decision block 90, the variables F1, F2, and F3 are compared to the value "1". A "1" in these variables is indicative of a collapsed strut being respectively detected by the static, loading, and roading routines. If the condition F1=F2=F3=1 is satisfied, the variable R is set to 1 and control returns to the main routine via blocks 94,96. Subsequent, execution of the control routine will result in the decision block 86 transferring control to a block 98 where the control is immediately returned to the main routine with none of the subroutines being executed.

Assuming now that not all of the subroutines have detected a collapsed strut, control will transfer to the decision block 92. In the main control routine, a roading flag will be set in response to either an input from a speedometer or by strut pressure fluctuations of a preselected magnitude or frequency, either being an indication that the vehicle is actually roading. A value of "1" in the roading flag causes control to transfer to the roading routine of FIG. 5. Alternatively, a zero in the roading flag is indicative of a static vehicle and control passes to block 100 where variables COUNTER, TURN, and F333 are all set to zero. These variables are all used in the roading routine and are reset here in anticipation of the next roading cycle. Control subsequently transfers to a decision block 102 in which a variable PASS is checked to determine if the static subroutine is in its first cycle at initial startup. If not, and the variable PASS is equal to the value zero, control transfers to the loading routine of FIG. 4. On the first cycle of the static subroutine, control will pass to block 104 where the variable F11 is set to 1 as an indication that the static subroutine has been performed. Thereafter, in a block 106 the pressure ratios for the diagonally associated vehicle struts 16L,18R;16R,18L are calculated. For example, the left front 16L and right rear struts 18R correspond respectively to the pressures P1 and P4 sampled in the main control routine. Similarly, the right front 16R and left rear 18L strut pressures correspond to P2 and P3. The diagonal pressure ratios are used to enhance the pressure differential caused by a collapsing strut. A collapsing left front strut will affect the corresponding right rear strut pressure. Thus, while the pressure differential of the collapsing left front strut can be detected, the pressure differential of the left front right rear ratio will be more significantly affected and easily detected. Similar reasoning can be applied to each of the struts and their corresponding diagonal pressure ratios.

Control passes to a decision block 108 where a determination is made whether the software is executing a first pass through the static routine during the initial startup in the life of the vehicle. A variable P has initially been set to the value 1 at vehicle initialization. Thus, on the first pass, control transfers from decision block 108 to block 110 where the upper and lower limits of the pressure ratio diagonals are set. The upper diagonal limits are set to 125% of the previously calculated value while the lower diagonal limits are set to 75% of the previously calculated value. Additionally, the variable P is set to the value 2. Thereafter, the upper and lower diagonal limits will remain at the initially calculated value as the variable P has been set to the value 2 and decision block 108 will bypass block 110. Subsequent to executing block 110, a block 112 returns control to the main control routine.

During the next iteration of the static subroutine, the decision block 108 will pass control to a series of decision blocks 114, 116, 118 and 120 where the diagonal pressure ratios are compared to their corresponding upper and lower limits. If the calculated diagonal pressure ratios exceed these limits, control transfers to block 122 where the variable PASS is set to the value "2" to prevent the static routine from being reexecuted via block 102. Also, variable F1 is set to the value "1" as an indication that the static routine has detected a collapsed strut. Control passes to a block 124 where control is returned to the main control routine. If, however, none of the diagonal pressure ratios are found to exceed their corresponding limits, then control passes to block 126 where the variable PASS is set to the value "2" and subsequently to a block 128 where control returns to the main control routine.

Referring now to FIG. 4 where the loading subroutine is illustrated, and control will ultimately pass after the variable PASS has been set to the value "2". In a decision block 129, the variable F222 is checked to determine if its value is equal to the value "1". The variable F222 is set to the value "1" at the completion of the loading routine and reset by the roading subroutine. If the variable F222 is equal to the value "1", then the subroutine "knows" that the loading subroutine has been executed without a subsequent roading subroutine and there is no value in reexecuting the loading subroutine. Thus, control transfers to block 130 which returns control to the main control routine.

If the variable F222 is equal to the value zero, then control transfers to a decision block 131. In the block 131 a variable named VARIABLE is compared to the value zero to determine if this cycle is the first of a particular loading cycle. If the loading software is in the first iteration of a particular loading cycle, and VARIABLE does equal the value zero, then the variable PCLR is set equal to LR and the variable PCRR is set equal to the variable RR in block 132. The variables PCLR and PCRR are indications of the previously calculated left and right rear strut pressures that correspond to the strut pressure at the beginning of a particular loading cycle. VARIABLE is reset to the value 1 in block 134 to maintain PCLR and PCRR at the values corresponding to the beginning of the loading cycle and control is returned to the main control routine in block 136.

During subsequent iterations of the loading subroutine, VARIABLE has been reset to the value "1", thus block 131 will pass control to a decision block 138 where the most recent strut pressures LR,RR are compared to the initial strut pressures PCLR,PCRR. In the illustrated embodiment, a difference of less than 30 psi results in control being returned to the main control routine via block 140. It is recognized that the values used herein are for illustrative purposes only and are known to vary between vehicle families. Decision block 138 attempts to ensure that a bucket load of material has been added to the vehicle and that slight changes in the rear strut pressures are not due to minor oscillations of the vehicle suspension. If the presently calculated rear strut pressures exceeds the initial rear strut pressures by 30 psi, then control transfers to a decision block 142 where the rear pressure differential is compared to a 100 psi differential setpoint. A differential of greater than 100 psi in either of the rear struts causes control to pass to block 144 where a variable INC is incremented by a value of "1". A decision block 146 receives control from decision block 144 and attempts to ensure that the received pressure values are stable by comparing the variable INC to the value 100. If either of the rear strut pressure differentials have exceeded 100 psi for 100 iterations of the loading subroutine, then the control assumes that the recorded pressures are stable and control transfers to block 148. In the block 148 variable F22 is set to the value "1" as an indication that the loading subroutine has been successfully completed and the control transfers to block 150. If the variable INC is less than 100, then the control assumes that the pressure is not stable and returns control to the main control routine via block 152. If neither pressure differential is greater than 100 psi, then the control assumes that the data has been taken at the time a bucket load of material is being dumped into the vehicle and large oscillations in the pressure differential are appearing. Thus, control transfers to block 154 where both INC and VARIABLE are reset to the value zero. Control then returns to the main control routine via block 156.

In the block 150, the variable LO TEST is calculated as a function of the left and right rear strut pressure differential ratio. Moreover, a relationship can be shown to exist between the relative stiffness (k) of each strut and the strut pressure differential. This relationship is defined as follows:

$$k = P2^{**}2/(P2-P1)$$

where P2 corresponds to the current strut pressure; and P1 corresponds to the previous strut pressure. Because the strut stiffness is dynamic throughout the range of strut movement, it would be difficult to determine whether a calculated stiffness was within an allowable range. However, each of the rear struts can be expected to react similarly to additionally loading and, in fact, will be in a similar range of movement. Therefore, each strut will have a stiffness similar to the other and a ratio of the two will yield a value of approximately 1. The equation for such a relationship is as follows:

$$kRR/kLR = [(LR - PCLR)^{*}(RR^{**}2)]/[(RR - PCRR)^{*}(LR^{**}2)]$$

where the ratio of the strut stiffness corresponds to the variable LO TEST. While load distribution has some effect on range of strut movement, it can be appreciated that there is an upper limit to this effect. Any LOTEST value exceeding a 30% differential in strut stiffness can be assumed to be attributed to a collapsing strut and therefore in blocks 158 and 160 the LOTEST value is compared to the range 0.7 to 1.3. Any value outside this range transfers control to block 162 where the variable F2 is set to the value "1" as an indication of a collapsed strut. Control passes to block 164 and the variable F222 is set to the value "1" to prevent the loading subroutine from being reexecuted absent a intervening roading cycle. Further, the variables INC and VARIABLE are also reset to zero in anticipation of the next loading cycle. Block 166 then receives control and transfers that control to the main control routine.

Referring now to FIGS. 5A and 5B where control ultimately transfers in response to the road flag being set to the value "1" via the decision block 92. In decision block 168 of the roading subroutine, the variable F333 is compared to the value zero and if not equal to zero causes control to pass to block 170 and then return to the main control routine. The variable F333 is initially set to the value "1" by the main control routine and reset to the value zero during the static subroutine. Thus, the decision block 168 prevents the roading subroutine to indicate completion of the static subroutine from being executed prior to execution of the static subroutine. With the variable F333 set to the value zero by the static subroutine, control transfers to a block 171 where the variable F222 is set to the value zero to enable the loading subroutine to be executed during the next loading cycle.

A variable COUNTER is incremented at block 172 as an indication of the elapsed roading time. Because execution loop time of the subroutines is consistent, the actual value of the variable counter is an indication of elapsed time. For example, a counter value equal to 40,000 is equivalent to an elapsed roading time of approximately 6 minutes, 40 seconds. Therefore, in decision block 174, the variable counter is compared to 40,000 and if the elapsed time is less than 6 minutes, 40 seconds, control transfers to decision block 176 when the variable TURN is compared to the value zero. If the variable TURN is equal to the value zero, then the control assumes that the software routine is on the first cycle of the roading subroutine and control transfers to block 178 where the variable TLF, TRF, TLR and TRR are respectively loaded with the previously detected pressures of LF,RF,LR,RR. Additionally, the variable TURN is set to the value "1" and control is returned to the main control routine via block 180. As a result of the variable TURN being set to the value "1", subsequent iterations of the roading routine result in decision block 176 transferring control to a decision block 182.

In the decision block 182, the left front strut pressure is compared to the previous left front strut pressure and a differential of greater than 30 psi results in a variable CLF being incremented by a value of "1". If the left front pressure differential does not exceed 30 psi, then block 184 is bypassed and the variable CLF is not incremented. Similarly, if the LF pressure is zero, then decision block 183 bypasses the block 184 and the variable CLF is not incremented. This provision prevents the variable from being incremented in the event that the strut suddenly loses pressure and collapses. Allowing the variable to be incremented when the strut is collapsed reduces the count differential and increases the possibility that the collapsed strut will go undetected. At the end of the six minute, 40 second period, the variable CLF will contain a count of the number of times the differential between two adjacent pressure readings of the left front strut exceeds 30 psi.

Control sequentially passes to blocks 186, 188 and 190 where similar operations are performed for each of the remaining strut pressures. The variables CLF, CRF, CLR and CRR each contain counts corresponding to the number of times adjacent pressure readings exceeded a 30 psi differential in the front struts and a 60 psi differential in the rear struts. In decision block 192, the previous pressure readings TLF, TRF, TLR and TRR are updated with the most recent pressure readings. Thereafter, block 194 returns control to the main control routine.

This process repeats during the roading routine until such time as the counter variable value exceeds 40,000. At such time, control transfers to block 196 where the variable F33 is set to the value 1 as an indication of a completed roading subroutine. Control transfers to block 198 where the variable CLFRF is set equal to the ratio of the left front CLF to the right front counts CRF. If the count ratio is within the range of 0.5 to 2, then the roading subroutine assumes that the left and right front struts are not collapsing as they have responded similarly to similar road conditions. However, should the count ratio exceed these values, then decision blocks 200 and 202 will transfer control to block 204 where the variable F3 is set equal to the value "1" as an indication of a collapsed strut. Similarly, the count ratio of the left and right rear struts is stored in the variable CLRRR in block 206. In blocks 208 and 210, the rear count ratio is compared to the range 0.5 to 2. If the count ratio exceeds that preselected range, then control again transfers to the block 204 and the variable F3 is set to the value 1. If the rear count ratio is within the prescribed limits, then control bypasses the block 204 and transfers directly to the block 212 where the variable F333 is set to the value 1. F333 prevents the roading subroutine from being reexecuted absent an intervening loading cycle. Control is transferred to block 214 and ultimately returns to the main control routine.

Industrial Applicability

In the overall operation of the off-highway truck 14, assume that the vehicle 12 is not being operated for the first time in its productive life, but has previously been used in a typical manner which includes the static, loading, and roading portions of a normal hauling cycle. At startup, when the vehicle is first turned on for daily operation, the main control routine first reads the pressures of each of the struts 16L,16R,18L,18R and stores these values in the variables P1,P2,P3,P4. A main control routine then calls the static subroutine where a determination is made that none of the subroutines have detected a collapsed strut. On the initial pass through the static subroutine, the diagonal pressure ratios LFRR,RFLR are calculated and compared to the previously calculated upper and lower diagonal pressure limits. If either of the diagonal pressure ratios LFRR,RFLR, are outside the upper and lower limits, the variable F1 is set to the value "1" indicating a collapsed strut. The diagonal pressure ratios are computed and compared to the upper and lower limits only once during initial daily startup.

While the vehicle operator waits for the vehicle to reach operating temperatures and pressures, the main control routine periodically samples the pressures of the struts and calls the static subroutine. After the initial cycle of the static subroutine, the loading subroutine will thereafter be called. At the initial iteration of the loading routine, the variables PCLR and PCRR are set to the left and right rear strut pressures corresponding to an empty truck. Subsequent iterations of the loading routine compare the most recent strut pressures to the empty truck strut pressures stored in variables PCLR and PCRR. A pressure differential of greater than 100 psi is used to indicate that a load of material has been added to the off-highway truck. To prevent an unstable pressure from being recorded, the loading subroutine will not calculate the rear strut stiffness ratio until after the vehicle has stabilized. The loading subroutine requires that the pressure differential remain greater than 100 psi for a total of 100 iterations. At this time the response of the left and right rear struts to the added load are compared to each other and if significantly dissimilar, then a collapsed strut is assumed and the flag F2 is set to the value 1. Independent of whether a collapsed strut is detected, the variable F222 is also set to the value "1" to prevent the loading subroutine from being reexecuted before an intervening roading subroutine.

However, in the instant example, the operator is simply waiting for the vehicle to attain operating status and does not at this time expect a load to be delivered to the bed of the truck. Therefore, the loading routine will be periodically called; however, the pressure differential will not exceed the required 100 psi. In the next portion of the operating cycle where the operator drives the vehicle to the loading site, the main control routine will recognize that the vehicle is roading, but an intervening loading cycle has not occurred and the roading flag will not be set. At the prescribed intervals the main routine will continue to sample the strut pressures and call the static subroutine. The static subroutine will respond to the absence of the road flag and call the loading subroutine until an actual loading cycle is performed.

The vehicle will ultimately cease roading as it reaches the loading site. Necessarily, as the vehicle is loaded, the rear strut pressures can be expected to respond with a pressure differential of greater than 100 psi as material is loaded onto the truck. When this 100 psi or greater pressure differential is detected and assumed stable, the loading subroutine will calculate the diagonal strut stiffness and compare these to the previously discussed limits.

After the loading cycle is complete, the operator will road the vehicle to the dumping site over which time the roading subroutine will once again be called to make a determination of the status of the struts. Over that period of time, a count is maintained for each of the struts indicating the number of times adjacent pressure readings for each strut exceeds the preselected value. At the end of that period, the counts for the front struts are compared and used as an indication of a collapsed strut if the counts are significantly different. Similarly, the rear strut counts are compared to one another and used as an indication of a collapsed rear strut if the counts are significantly different. For example, in a vehicle where the struts are properly charged, each of the struts can be expected to respond to the road and load conditions in a manner similar to that strut on the same axle of the vehicle. Moreover, if one of the struts on an axle is partially collapsed, pressure variations of significantly smaller magnitude can be expected. Thus, an axle with a partially collapsed strut will see a significantly lower count for the collapsed strut and a corresponding greater differential between the struts on that axle.

At the dumping site, after the roading cycle has been completed, the static subroutine will periodically transfer control to the loading subroutine. The loading subroutine will not be executed until the driver returns to the loading site and the next loading cycle begins.

Thereafter, the process repeats with each roading and loading cycle.

Other aspects, objects and advantages of this invention can be obtained from a study of the drawings, the disclosure, and the appended claims.

What is claimed is:

1. A method for detecting a collapsed strut of a moving work vehicle having a plurality of left and right strut mounted wheels, comprising:
   periodically sensing the internal pressure of selected struts;
   delivering a plurality of strut pressure signals each having a magnitude correlative to the internal pressure of each respective strut;
   storing a first set of the periodically delivered strut pressure signals;
   computing the difference in magnitude between said first set and a second set of the periodically delivered strut pressure signals for each strut;
   counting the number of times the difference in magnitude exceeds predetermined amounts for each strut; and
   delivering a signal indicative of a collapsed strut in response to a ratio of said counts exceeding a predetermined value after a predetermined time period.

2. A method, as set forth in claim 1, wherein said step of counting includes counting the number of times the difference between said first and second sets of the left front strut pressure exceeds 30 psi.

3. A method, as set forth in claim 1, wherein said step of counting includes counting the number of times the difference between said first and second sets of the right front strut pressure exceeds 30 psi.

4. A method, as set forth in claim 1, wherein said step of counting includes counting the number of times the difference between said first and second sets of the left rear strut pressure exceeds 60 psi.

5. A method, as set forth in claim 1, wherein said step of counting includes counting the number of times the difference between said first and second sets of the right rear strut pressure exceeds 60 psi.

6. A method, as set forth in claim 1, wherein said step of counting includes counting separately for the front left strut, the front right strut, the rear left strut and the rear right strut.

7. A method, as set forth in claim 6, wherein said step of delivering a collapsed strut signal includes computing the ratio of rear strut counts and front strut counts, and delivering said collapsed strut signal when either of said ratios are not between 0.5 and 2.0, inclusively.

8. A method, as set forth in claim 1, wherein said predetermined time period is approximately 7 minutes.

* * * * *